Patented June 8, 1937

2,083,220

UNITED STATES PATENT OFFICE 2,083,220

PROCESS FOR BREAKING PETROLEUM EMULSIONS

Melvin De Groote, St. Louis, and Bernhard Keiser, Webster Groves, Mo., assignors to The Tretolite Company, Webster Groves, Mo., a corporation of Missouri No Drawing. Application August 21, 1936, Serial No. 97,219

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises a blown oil body which has been saturated by action of a labile additive reagent of the kind hereinafter described, and followed by a reaction in which the labile additive reagent is removed in such a manner as to leave the product completely or substantially completely saturated.

It has long been known that various animal, vegetable and marine oils can be blown or oxidized so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or may be conducted at a much higher temperature, such as 175° to 225° C. Oxidation may be conducted in absence of catalysts or in presence of catalysts. Such catalysts may consist of metallic salts, such as cobalt or manganese oleate, or may consist of organic material, such as alpha pinene or the like. Oxidation may be conducted in a relatively short time, such as 20 hours, or may take 200 hours or more.

The blown or oxidized oils usually employed in demulsification of crude petroleum emulsions are generally selected from unsaturated oils of the non-drying type, or the semi-drying type, including the marine oils, such as marine mammal oils, but rarely from the active drying oils, such as linseed oil and perilla oil. Although glycerides of saturated acids, such as stearin or palmitin may be oxidized, such blown materials are rarely employed in producing demulsifying agents for petroleum emulsions. Oxidation of the active drying oils, such as linseed oil or perilla oil is generally apt to yield a solid or almost solid product, and as a result, demulsifying agents are rarely produced from such materials alone, but may be produced from a mixture of oils containing some proportion of such active drying oils. In actual practice, blown oils of the kind employed in the demulsification of the petroleum emulsions are derived from castor oil, rapeseed oil, cottonseed oil, peanut oil, corn oil, olive oil, and various marine oils, such as sardine, herring, menhaden, and pilchard oil.

When an unsaturated fatty acid or oil, for instance, olive oil, is blown or oxidized with air, hydroxyl groups are formed at the ethylene linkage. This is particularly true if oxidation is carried out with moist air. It is believed that oxygen is first absorbed so as to saturate the ethylene linkage, and that further reaction takes place with water to produce two hydroxyl groups. Whether or not this is the correct explanation, it is known that hydroxyl groups are formed. For instance, "Chemistry of the Oil Industry", by Southcombe, 1926, page 181, in speaking of blown (oxidized) oils, states as follows:

"Hydroxyl groups are unquestionably formed, as the considerable rise in acetyl value proves".

Patents which describe conventional blown oils or conventional methods of making various blown oils for various purposes, (including in some instances for the purpose of demulsifying crude oils), include the following:

U. S. Patents Nos. 1,929,399, dated Oct. 3, 1933, to Fuchs; 1,969,387, dated Aug. 7, 1934, Tumbler; 2,023,979, dated Dec. 10, 1935, Stehr; 2,041,729, dated May 26, 1936, Seymour; 1,984,633, dated Dec. 18, 1934, De Groote and Keiser.

Mild oxidation of castor oil (see "Chemical Technology and Analysis of Oils, Fats and Waxes", by Lewkowitsch, 6th edition, volume 2, page 406) produces relatively small modifications in certain important chemical indices, such as the iodine value, the acetyl value, and the saponification value. If drastic oxidation takes place, either by continued mild oxidation, or by more vigorous oxidation at the very beginning of the reaction, as induced by either a higher temperature of reaction, or the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; a saponification value of 215 to 285 or thereabouts; an acetyl value of approximately 160 to 200, an increased viscosity; a specific gravity of almost 1 or even a trifle over 1 at times; and in absence of other coloring matter, a deep orange color.

Drastically oxidized castor oil can be prepared by well known methods, or such products can be purchased on the open market under various trade names, such as "blown castor oil", "bodied castor oil", "blended castor oil", "blended bodied castor oil", "processed castor oil", "oxidized castor oil", "heavy castor oil", "viscous castor oil", etc. These various names appear to be applied to drastically oxidized castor oils, which are different in degree but not different in kind.

In producing the demulsifying agent employed in our process, we prefer to use drastically oxidized castor oil having the following characteristics:

| | |
|---|---|
| Acid number | 15.1 |
| Saponification number | 230.5 |
| Iodine number | 53.5 |
| Acetyl number | 164.0 |
| Hydroxyl value | 188.0 |
| Percent unsaponifiable matter | 1.1 |
| Percent nitrogen | 0.0 |
| Percent $SO_3$ | 0.0 |
| Percent ash | Trace |

One of the peculiar things about blown oils is that gaseous oxidation, regardless of how drastic or how long it may be continued, only reduces unsaturation as measured by the analytical iodine number to approximately half the original value, or one half the normal iodine value, based on a single ethylene linkage. For instance, if castor oil or rapeseed oil or American sardine oil is blown by any of the unconventional processes, oxidation appears to stop when the iodine number drops to a value of approximately 40 to 45. Previous reference has been made to a blown castor oil which is used as a raw material in preparing our preferred reagent. This particular oil has an iodine value of 53 or thereabouts. It is not necessary that oxidation or blowing, lower the iodine value to the lowest limit prior to saturation in the manner hereinafter described. In the subsequent discussion, reference will be made to blown castor oil for purposes of illustration only, but it should be understood that the same procedure can be applied to other blown oils of the kind previously mentioned, with the result that one obtains effective demulsifying agents.

We have found that if blown castor oil of the kind previously described, having an iodine number of 53 to 58, or less, is treated with an additive reagent, such as sulfur, sulfur chloride, chlorine, bromine, sulfuric acid, phosphorus pentoxide, etc., that the product obtained by such saturation of the blown oil may be treated subsequently, so as to eliminate the added element in such a manner as to leave the product saturated, or substantially saturated. The additive reagents previously referred to are of the kind which normally saturate an ethylene linkage, if it occurs in a fatty hydrocarbon chain, for example. After such additive reagents have combined with the blown oils, they can be removed in various ways. In some instances heating alone will accomplish their removal. For instance, chlorinated blown oils, particularly chlorinated castor oils, may be heated so as to eliminate the chlorine, with the result that the product remaining after such elimination of the chlorine is saturated, due to some molecular change or rearrangement. In other instances where continued gaseous oxidation will lower the iodine value of castor oil to approximately 40 or 45, it has been found that if the blown castor oil is then subjected to chlorination, the iodine value can be lowered to 10 or 20, or even less. If such chlorinated blown oil is oxidized further by means of air, the chlorine can be removed and apparently replaced by oxygen, although in absence of such prior halogenation, apparently the oxygen will not completely saturate or nearly completely saturate the blown oil.

If, after a reactive fatty product, such as blown oil is treated with a sulfuric acid or some other suitable sulfonating agent, such as oleum, chlorsulfonic acid, etc., it is well known that the product so obtained can be treated with water, so that sulfuric acid is eliminated with the saturation of the ethylene linkage or its equivalent by a hydrogen atom, and a hydroxyl radical. This is comparable to the decomposition of fatty acid sulfates by the action of water, such as the conversion of oleic acid hydrogen hydrogen sulfate into hydroxy stearic acid. Anhydrous phosphoric acid, and more particularly, phosphorus pentoxide, act in the same manner as sulfuric acid in its various forms. Sulfurized blown oils can be treated either by further oxidation, or by reaction with water, especially in the presence of either added acid or added alkali. The added alkalis include caustic soda, caustic potash, etc. The added acids include such acids as dilute sulfuric acid, dilute hydrochloric acid, etc. The expression "sulfurized", as herein used, applies to blown oils which have been treated with sulfur or sulfur chloride. Hereinafter we will refer to the addition agent which saturates the blown oil as a "labile" addition reagent. The word "labile" is sometimes used to mean unstable. In the present instance, it is not intended to imply that the addition compound obtained by reacting the blown oil with a suitable reagent is unstable, because such compounds may be perfectly stable. However, they are of the kind which can be removed by some simple procedure, such as the action of heat, further gaseous oxidation, treatment with water in presence of or absence of added acids or alkalis, etc.

It is obvious, of course, that the expression "labile additive reagent" is not intended to include the gaseous oxidizing reagents employed in producing blown oils, such as air, ozone, ozonized air, etc. Furthermore, it is known that materials such as aldehydes combine with ammonia, or even with amines, to give new compounds. Some blown oils may contain a greater or lesser percentage of aldehydic acids or the like, and presumably the aldehyde radicals of such aldehydic acids could react with ammonia or ammonium compounds. Such reaction, of course, does not involve the ethylene linkage. For this reason, ammonia and ammonium compounds, such as amines, are not intended to be included in the scope of the expression "labile additive reagents".

It is believed that the most desirable method of removal is by heat alone, or by heat in conjunction with gaseous oxidation. If such procedure does not eliminate the added reagent, then reaction with water alone or water in presence of a mineral acid, is the next most satisfactory procedure. If the previously mentioned methods do not eliminate the added reagent, then it can be eliminated by treatment with water in presence of an added alkali. In a few instances it may even be necessary to resort to such treatments under increased pressure in an autoclave, such as a pressure of 50 to 150 lbs., instead of atmospheric pressure, and with the corresponding increase in temperature.

Our preferred reagent or demulsifying agent is prepared by the use of sulfuric acid in preference to the use of such materials as sulfur, bromine, etc. The particular reagent selected to reduce saturation depends upon its cost, ease of combination, one's ability to control the reactions, and effectiveness of the resultant product, together with the ease of removal of the saturation agent, as previously discussed.

We prefer to use a blown oil of the kind previously specified and mix the same with approximately an equal volume of chloroform. If desired, one may use, instead of chloroform, any one of the various inert solvents which are employed in the art in sulfonation or sulfation of fatty materials. Such solvents include carbon tetrachloride, dichlorpentane, ethylene dichloride, tetrachlorethane, tetrachlorethylene, trichlorethylene, suitable petroleum hydrocarbons, etc. We prefer to add the sulfuric acid at a relatively low temperature, such as 25° C. or less. Generally speaking, 66° sulfuric acid, equivalent to 10 to 15% by volume of the blown castor oil, is sufficient for saturation. When the sulfuric acid has been added, the mass is allowed to stand with constant stirring for approximately three hours, and then a volume of water equal to twice the volume of the acid employed is added. The entire mass is boiled or steamed for approximately two hours under a reflux condenser so as to prevent loss of solvent. The reaction mass is then allowed to separate and the dilute acid withdrawn. In some instances, chlorinated aromatic materials which are not particularly reactive to sulfuric acid may be employed, such as mono-chlorbenzene and the like. If such aromatic materials are employed, care must be exercised to prevent the formation of aromatic sulfonic acids. If a blown oil which is being saturated is soluble in a petroleum hydrocarbon, it may be more desirable to use petroleum ether or a somewhat higher boiling solvent, instead of chloroform or the like, because subsequent separation from the aqueous acid layer becomes easier than when chlorinated hydrocarbons are employed.

The solvent which is added during the sulfation or sulfonation process may be distilled off and re-employed for the same purpose. In other instances, it may be permitted to remain in the material and act as a diluent so as to lower the viscosity of the final product which is used as a demulsifying agent.

It is to be noted that the product so obtained is substantially free from the organically combined sulfur; in other words, the material so obtained contains no fatty acid sulfates or fatty acid sulfonates. An analysis of the product might not reveal that it had necessarily been treated with sulfuric acid at any time. Indeed, an equivalent amount of anhydrous phosphoric acid or phosphorus pentoxide may replace the sulfuric acid, with the result that the final product would be of substantially the same composition. It is also known that certain metallic chlorides such as magnesium chloride, aluminum chloride, and more specifically, zinc chloride, have the ability to saturate ethylene linkages in fatty materials, and thus one might replace sulfuric acid in the above process advantageously by means of a concentrated zinc chloride solution, and might eliminate the added solvent. It is only necessary, in order to produce the demulsifying agent employed in the present process, to add a reagent which combines in such a manner as to saturate the ethylene linkage and which is of such a character that it is readily removable in the manner or by the methods previously described, or by their obvious equivalents.

In many instances, it may be more satisfactory to employ chlorine as a saturating agent, because it can be readily removed by heating with subsequent oxidation. If one desires to employ chlorine, then we have found the following procedure most suitable. We mix approximately 1,000 lbs. of blown castor oil of the kind previously described, with approximately 1,000 lbs. of carbon tetrachloride, and slowly bubble chlorine through the mass until the iodine value calculated on the carbon tetrachloride-free basis is approximately 10 to 20. The reaction is then stopped and the carbon tetrachloride distilled off. The chlorinated mass is then heated to approximately 115° C., and air passed through the mass until all or substantially all the chlorine is removed.

Naturally, although the purpose intended is to remove all of the added agent employed to produce saturation, it is understood, of course, that if relatively insignificant quantities of sulfur in organically combined form, or chlorine or bromine or phosphorus in an organically combined form happen to remain, there is no departure from the spirit of the invention.

The materials obtained by subjecting blown oil, and more particularly, blown castor oil, to the saturation and subsequent removal process, may show some acidity, due perhaps, to the acidity of the blown oil prior to saturation or for some other reason, due to the various side reactions which may take place during the above described procedure. The product may be used without removal of the acidity, if present. If desired, such acidity can be neutralized by use of the conventional bases, such as caustic soda, caustic potash, and ammonia, but it is preferably removed by means of an amine, such as triethanolamine, mono-ethanolamine, amylamine, benzylamine, piperidene, etc.

In the claims, the expression "blown oil derivative" is used in its broadest sense to include a product or products in which all or part of the residual acidic hydrogen, if present, has been neutralized by one or more of the suitable bases previously mentioned, or in any equivalent manner. The acidic hydrogen can also be removed by esterification by mixing the product with an alcohol, such as ethyl alcohol, propyl alcohol, glycerol, ethylene glycol, and the like, and subjecting the mixture to conventional esterification processes, such as passing through dry hydrochloric acid gas at a temperature above the boiling point of water.

It has been pointed out that in the manufacture of the demulsifying agent used in the present process, conventional blown oil represents the raw material. It is well known, of course, that fatty acids, for instance, oleic acid, ricinoleic acid, etc., may be blown or oxidized in the same manner that olive oil or castor oil is oxidized. Such oxidized or blown fatty acids are different, of course, from the oxidized blown oils themselves, but are of value in demulsification of crude oil, and may be subjected to the same sort of treatment or procedure previously described, to produce a demulsifying agent suitable for use in practising our process.

Similarly, the estolides of blown oils can be obtained by subjecting the blown oils to an acid saponification (hydrolysis) or hydrolytic cleavage by contact with dilute mineral acid, as is customary in the Twitchell process or the modification of Twitchell process in which a petroleum sulfonic acid (Petroff reagent) is employed. The oxidized or blown oils, being hydroxy acids, polymerize during such hydrolytic process and polymerize more readily if they are heated to approximately 115° C. after the completion of the hydrolytic process. Such materials are referred to as blown oil estolides, and their manufacture is described in detail in our co-pending application for patent Serial No. 97,217, filed Aug. 21, 1936. Such estolides may be subjected to the same sort of chemical treatment as has been described for the blown oils, to produce a demulsifying agent suitable for use in our present process.

In order that we may employ a comprehensive term which will include not only blown oils, but also oxidized or blown fatty acids and also oxidized or blown estolides, we have used the expression "blown oil body" in some of the claims as a broad generic term intended to include within its scope all three of these classes of materials above discussed. The blown oils themselves, as differentiated from the blown or oxidized fatty acids and as differentiated from the blown or oxidized estolides, will be referred to simply as "blown oil". It is understood that the sulfuric acid compounds employed for saturation, are such as to form addition products by reaction at an ethylene linkage. In other words, any sulfuric acid compound selected must be capable of entering into reactions of the type that will permit formation of addition products. It is manifest that this excludes inorganic sulfates, such as sodium sulfate and the like.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, or the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000, or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 50,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent comprising a blown oil body derivative obtained from a blown oil body, which has been treated by means of a labile additive reagent with subsequent removal of said additive reagent.

2. A process for breaking petroleum emulsions of the water-in-oil type, which consists in subjecting the emulsion to the action of a demulsifying agent comprising a blown oil derivative obtained from a blown oil which has been treated by means of a labile additive reagent with subsequent removal of said additive reagent.

3. A process for breaking petroleum emulsions of the water-in-oil type, which consists in subjecting the emulsion to the action of a demulsifying agent comprising a blown rapeseed oil derivative derived from a blown rapeseed oil which has been treated by means of a labile additive reagent with subsequent removal of said additive reagent.

4. A process for breaking petroleum emulsions of the water-in-oil type, which consists in subjecting the emulsion to the action of a demulsifying agent comprising a blown marine oil derivative derived from a blown marine oil which has been treated by means of a labile additive reagent with subsequent removal of said additive reagent.

5. A process for breaking petroleum emulsions of the water-in-oil type, which consists in subjecting the emulsion to the action of a demulsifying agent comprising a blown castor oil derivative derived from a blown castor oil which has been treated by means of a labile additive reagent with subsequent removal of said additive reagent.

6. A process for breaking petroleum emulsions of the water-in-oil type, which consists in subjecting the emulsion to the action of a demulsifying agent comprising a blown castor oil derivative derived from a blown castor oil which has been treated by means of a sulfuric acid compound capable of entering into addition reactions with subsequent removal of said sulfuric acid compound.

7. A process for breaking petroleum emulsions of the water-in-oil type, which consists in subjecting the emulsion to the action of a demulsifying agent comprising a blown castor oil derivative having an iodine number of less than 20, derived from a blown castor oil which has been treated by means of a sulfuric acid compound capable of entering into addition reactions with subsequent removal of said sulfuric acid compound.

8. A process for breaking petroleum emulsions of the water-in-oil type, which consists in subjecting the emulsion to the action of a demulsifying agent comprising a blown castor oil derivative having an iodine number of less than 20, derived from a blown castor oil which has been treated by means of a sulfuric acid compound capable of entering into addition reactions with subsequent removal of said sulfuric acid compound, said derivative being mixed with a suitable solvent.

MELVIN DE GROOTE.
BERNHARD KEISER.

---

CERTIFICATE OF CORRECTION.

Patent No. 2,083,220.　　　　　　　　　　　　　　June 8, 1937.

MELVIN DE GROOTE, ET AL.

It is hereby certified that error appears in the printed specification of the above numbered patent requiring correction as follows: Page 5, first column, line 15, for the numeral "50,000" read 5,000; and that the said Letters Patent should be read with this correction therein that the same may conform to the record of the case in the Patent Office.

Signed and sealed this 20th day of July, A. D. 1937.

Henry Van Arsdale (Seal)　　　　　　　　　　　　　　　Acting Commissioner of Patents.